United States Patent [19]
Johnson

[11] Patent Number: 4,794,616
[45] Date of Patent: Dec. 27, 1988

[54] LASER SYSTEM WITH SOLID STATE FLUORESCENT CONVERTER MATRIX HAVING DISTRIBUTED FLUORESCENT CONVERTER PARTICLES

[75] Inventor: Christopher D. Johnson, Binghamton, N.Y.

[73] Assignee: General Electric Company, Binghamton, N.Y.

[21] Appl. No.: 815,326

[22] Filed: Dec. 31, 1985

[51] Int. Cl.$^4$ .............................................. H01S 3/091
[52] U.S. Cl. ......................................... 372/70; 372/39
[58] Field of Search ....................... 372/39, 40, 41, 70; 252/301.16, 301.18; 313/485, 486

[56] References Cited

U.S. PATENT DOCUMENTS

| | | | |
|---|---|---|---|
| 2,030,440 | 2/1936 | Fritze et al. | 313/485 X |
| 3,611,188 | 10/1971 | Snitzer | 372/40 |
| 4,015,217 | 3/1977 | Snitzer | 372/40 X |
| 4,044,315 | 8/1977 | Snitzer | 372/40 |

Primary Examiner—Eugene R. LaRoche
Assistant Examiner—Seung Ham
Attorney, Agent, or Firm—I. David Blumenfeld

[57] ABSTRACT

A laser system which includes a solid state fluorescent converter having fluorescent converter particles distributed in a glass support. The fluorescent particles are selectively distributed in the glass matrix permitting concentration of the fluorescent particles in the vicinity of laser.

6 Claims, 1 Drawing Sheet

LASER SYSTEM WITH SOLID STATE FLUORESCENT CONVERTER MATRIX HAVING DISTRIBUTED FLUORESCENT CONVERTER PARTICLES

BACKGROUND OF THE INVENTION

It has been suggested that the optical coupling efficiencies of neodymium (Nd) lasers pumped by xenon flash lamps can be involved by the use of fluorescent converters. A fluorescent converter absorbs light wavelengths which are in the spectral region in which the Nd ions do not absorb, and re-emits it in the bands which the Nd ions do absorb. Thus, the fluorescent and material absorbs the light outside the spectral region for the laser material and fluoresces strongly at one of the pump bands of the laser material.

It has been found, however, that fabrication solid state fluorescent converters require large pieces of hard-to-grow crystalline material which are also difficult to cut to the desired tolerances and shapes. That is, crystalline fluorescent converter materials such as chromium doped emerald; $Cr^{+3}$: $Sr Ga F_5$; $Cr^{+3}$:$Sr AlF_5$ chromium doped gadolinium, scandium; Gallium, Garnet (GSGG), etc. are extremely difficult to grow in the sizes required for today's larger laser slabs and rods and are not readily fabricated in the complex shapes often necessary to obtain the highest optical coupling efficiencies.

SUMMARY OF THE INVENTION

Applicant has now found that large fluorescent converters may be produced for extremely high optical coupling efficiencies in any variety of shapes, by utilizing small crystals (preferably one millimeter diameter spheres) supported in a glass matrix having high transmissivity and the same refractive index and coefficient of thermal expansion as the fluorescent converter particles. By supporting the fluorescent converter particles in a glass matrix the concentration of the particles within the matrix can be controlled to have low concentration in the vicinity of the flash lamp and a zone of high fluorescent converter particle concentration nearest the active laser material. This permits variation of the absorption coefficient of the material at will and further assures that most of the light, and hence, most of the fluorescence will be concentrated near the surface of the active laser material thereby enhancing and optimizing the optical coupling efficiency between the converter and the laser material.

It is therefore an objective of the invention to provide a laser system including a solid state fluorescent converter element to enhance optical efficiency of the system.

Further objectives of the invention is to provide a laser system with a solid state fluorescent converter for the laser wherein the fluorescent converter particles are supported in a glass matrix.

Yet another objective of the invention is to provide a solid state converter for a laser system which may be readily fabricated an any desired shape.

Still another objective of the invention is to provide a solid state fluorescent converter of the matrix type in which the fluorescent converter particles are concentrated nearer the laser surface to enhance optical coupling.

Other objectives and advantages of the instant invention will become apparent as the description thereof proceeds. Other features believed characteristic of this invention are set forth with particularity in the appending claims. The invention itself however, together with other objects and advantages thereof will best be understood by reference to the following description taken in conjunction with the accompanying drawings in which:

The preesent invention utilizes any one of a number of selected crystalline fluorescent converter particles which are supported in and fused to a glass matrix. The various fluorescent converter particles which may be utilized with the invention are trivalent chromium doped GSGG, i.e., $CR^{+3}$ doped emerald and other similar materials.

The glass matrix is formed of any glass which essentially has the same coefficient of thermal expansion as the fluorescent converter materials—indices which are usually in the range of 1.5 to 2—and the coeffi thermal expansion—normally $10^{-6}$-$10^{-7}$ per degree.. The glass in which the converter particles are distributed must be highly transmissive for the pump bands of both the laser material so that light in this band is transmitted directly through the glass to the laser and light absorbed by the fluorescent converter material. This only requires that the glass must be highly transmissive at wave lengths longer than approximately 300 nanometers. Examples of glass meeting all these qualifications are so-called Schott SF glasses fabricated and sold by the Schott Company of 18642 York Ave., Duryea, Pa. Alternatively, mixtures of PbO, $Al_2O_3$ and fused silicon may also be utilized. The amount of glass in the matrix should be as low as possible while yet binding fluorescent converter particles. Thus, about 10 to 20% by volume of the glass binder should be utilized to product the fluorescent converter matrix structure. Since the glass will normally melt at temperatures much lower than those of the crystalline fluorescent particles the glass particles may be placed at any suitably configured mold and heated at a temperature of approximately 1,000 degrees F. for a period sufficient to cause the glass to become fluid and flow around the fluorescent converter particles binding them together in a matrix of fluorescent converter particles and the glass binder. Neodymium glass laser slabs or neodymium YAG laser slabs or rods normally have pumping bands around 550, 380 and 800 nanometers. Thus the only light in these bands from the flash lamp are useful in producing direct lasing of the laser material. The fluorescent converting particles absorb emissions from the flash lamp or other source at wavelengths outside of the laser materials absorbing spectrum and then fluoresce at the wavelength at which the laser material absorbs; viz., 380, 550 and 800 nanometers. Thus, energy in the band outside of the normal laser absorption spectrum can thus be utilized by the spectral conversion of the particle into light useful in producing laser action.

Figure 1:
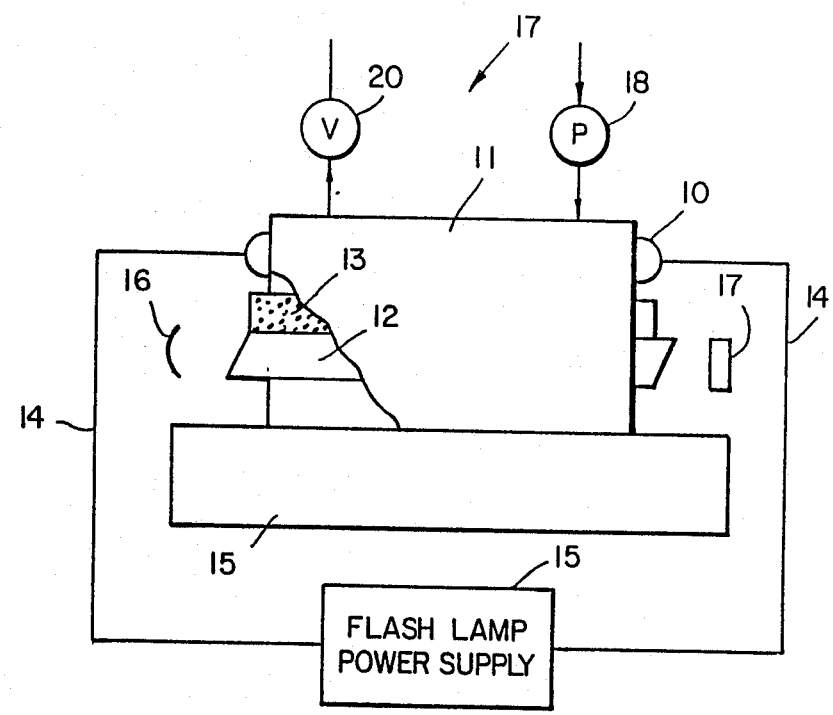
FIG. 1 is a block diagram of a laser system in accordance with the invention utilizing a solid state fluorescent converter positioned between the flash lamp light source and the laser material.

Referring now to FIG. 1 of the drawings, a block diagram of a laser system incorporating a solid state fluorescent converter matrix is illustrated and shows a light source 10 in the form of a flash lamp mounted in a housing 11 which also supports the laser material 12 and solid state fluorescent converter 13. The lamp 10 may typically be xenon gas filled lamp. In order to prevent "solarization" of the glass due to ultraviolet emissions; i.e., coloration of the glass which negatively affects the transmissivity of all the light in all the bands through the glass may be prevented by doping the envelope of lamp 10 with Cesium, preferably trivalent Cr+3.

The lamp electrodes are connected through leads 14 to a flashlamp power supply 15 which pulses the lamp intermittently the light flashes are transmitted to laser material 12 through solid state fluorescent converter 13 which takes the form of a glass matrix supporting fluorescent converting particles. The precise structure of this matrix 13 will be discussed in detail in connection with FIG. 2. Suffice to say, however, that fluorescent converter structure 13 is so constructed that the bulk of these particles are located in the immediate vicinity of a surface of a laser slab 12 to enhance optical coupling.

The laser is mounted on an optical bed 16 and could include a mirror surface 16 at one end and a partially mirrored surface 17 at the other to form the lasing cavity. The laser slab itself has a typical Brewster angle surfaces through which light enters and departs from the laser element. A coolant system shown generally at 17 is provided for the laser housing and includes a source of cooling liquid which is brought into housing 11 through a coolant pump 18 and is removed from the housing through a conduit and valve system 20. The coolant fills a laser housing around the lamp and laser material, whether slab or rod. The coolant exits the housing through the valve 20 and is recirculated to any suitable coolant reservoir.

Figure 2:
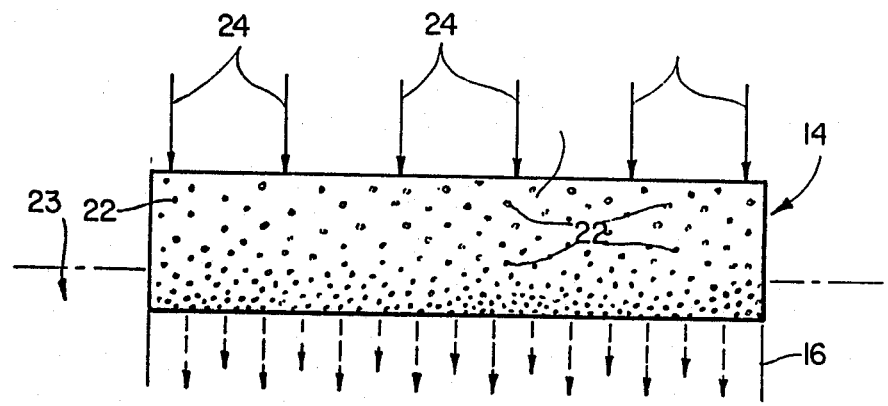
FIG. 2 illustrates the solid state converter matrix having the fluorescent converter particles distributed therein a desired distribution pattern and gradient.

FIG. 2 shows the solid state fluorescent converter containing fluorescent converter particles in a glass matrix. The solid state converter consists of a glass matrix 13 having a plurality of spherical or other small fluorescent converter particles 22 dispersed therein. In the preferred embodiment shown in FIG. 2, a high particle concentration zone 23 is located at the surface of the converter matrix which is adjacent to laser slab 12. That is, the laser slab is, as may be seen from FIG. 2, very much greater than the dispersion of the particles through the remainder of the glass matrix 13. This fashion, a relatively small portion of the light from the flash lamp is absorbed in the vicinity of the lamp and away from the laser slab or material. By concentrating the largest number of fluorescent converter particles in the zone 23 near the slab or other active material the bulk of the light absorbed by the converter particles is re-emitted at near the surface of the laser material. Thus, the solid state fluorescent matrix converter is characterized by a zone of relatively low concentration near the interface of the flash lamp and the converter and a zone of high concentration near the interface of the lasing material and the fluorescent converter thereby optimizing the optical efficiency of the system.

Light from the flash lamp which ranges spectrally from 300 to 900 nanometers impinges on one surface of the fluorescent converter as shown by the solid arrows 24. Since the glass 21 comprising the matrix of the converter is transparent; i.e., has high transmissivity in the order of 995 or more, for the entire band, light in the spectral pumping band of the laser passes directly through and to the laser material. The remaining light which falls outside of the pumping bands of the laser material but falls within the spectral absorption band of the fluorescent converter particles are absorbed by these particles and a portion is re-emitted from these particles with a spectral shift to the absorption bands of the laser material. Typically, fluorescent particle converters will convert anywhere from 30 to 40% of the light outside of the absorption band of the laser into the spectral absorption band thereby adding to the efficiency of the laser system by recovering this 30 to 40% of light for useful lasing purpose.

The fluorescent converter 13 illustrated in FIG. 2 is shown generally as a rectangular slab. However, one of the important advantages of a solid state converter which takes the form of a glass matrix supporting and fusing individual small fluorescent converter particles is that the solid state fluorescent converter may take any number of shapes since molding techniques are readily available for many more and more complex shapes. That is, the glass matrix can be deposited in the mold in the form of glass FRIT or small glass of particles and the fluorescent particles inserted also in layers in the mold and then the entire mass of powders is fueled by heat temperature and pressure to standard molding techniques to form a solid state converter of various shapes and configurations. In addition the fluorescent converter need not have a single zone of high concentration. It is possible to establish control gradients throughout the thickness of the converter by laying down various layers of glass and particles, with each layer or zone having a different particle concentration to acquire whatever fluorescent converter concentration gradient may be desired for optimum control of the fluorescent converter emission.

The converter particle may be from small easily grown crystals which are crushed in a Ball Mill to form to 1MM spheres.

It will be apparent from the previous discussion that a highly useful and effective solid state fluorescent arrangement has been provided which is highly effective. readily manufacturable in a variety of shapes ranging from simple to complex, is much less costly to manufacture than fluorescent converters which require the growth of entire crystalline elements since the individual fluorescent particle materials only in small sizes than further ground, are much less expensive to manufacture than large single crystals.

While particular embodiments of this invention have been shown, it will of course, be understood that the invention is not limited thereto since many modifications, both in the structural arrangement and in the instrumentalities employed may be made. It is contemplated by the appended claims to cover any such modifications as lie within the true spirit and scope of this invention.

What is claimed as new and desired to be secured by Letters Patent of the U.S. is:

1. In a laser system, the combination comprising:
 (a) an active laser element;
 (b) a light source associated with said laser for pumping said laser to produce coherent, monochromatic light;
 (c) means positioned between said laser element and said light source for increasing the optical efficiency of the system by converting at least a portion of the light from said source which falls outside of the laser pumping band into light in the pumping band including:
  (1) a solid state fluorescent converter element exposed on one side thereof to light from said source for spectrally shifting light outside of the laser pumping band into light in the pumping band;

(2) said converter element comprising a matrix which is transparent to and transmits light from said source including light in the pumping band and which physically supports an aggregate of individual converter particles dispersed throughout said matrix, the said individual particles absorbing light outside of the pumping band and reemitting a portion thereof as light in the pumping band, said dispersed particles being located in said matrix so as to concentrate the particles in a zone on the other side of said converter and located adjacent to the laser.

2. The laser system according to claim 1 wherein said particles are dispersed in a non-lasing glass matrix.

3. The laser system according to claim 2 wherein said glass matrix comprises from 20-30 weight percent of said converter element.

4. The laser system according to claim 1 wherein the concentration of converter particles varies throughout the matrix.

5. The laser system according to claim 1 wherein the matrix contains a high converter particle concentration zone.

6. The laser system according to claim 1 wherein the high converter particle concentration zone is located adjacent to said laser element.

* * * * *